United States Patent
Dubey

(10) Patent No.: US 8,861,364 B2
(45) Date of Patent: Oct. 14, 2014

(54) METHOD AND APPARATUS FOR IMPLEMENTING NON-BLOCKING PRIORITY BASED FLOW CONTROL

(75) Inventor: Ajay Dubey, San Jose, CA (US)

(73) Assignee: Altera Corporation, San Jose, CA (US)

( * ) Notice: Subject to any disclaimer, the term of this patent is extended or adjusted under 35 U.S.C. 154(b) by 168 days.

(21) Appl. No.: 13/107,689

(22) Filed: May 13, 2011

(65) Prior Publication Data

US 2011/0286335 A1 Nov. 24, 2011

Related U.S. Application Data

(60) Provisional application No. 61/345,124, filed on May 16, 2010.

(51) Int. Cl.
| | |
|---|---|
| *H04L 12/26* | (2006.01) |
| *H04L 12/825* | (2013.01) |
| *H04L 12/801* | (2013.01) |
| *H04L 12/841* | (2013.01) |
| *H04L 12/835* | (2013.01) |
| *H04L 12/931* | (2013.01) |

(52) U.S. Cl.
CPC ............. *H04L 47/10* (2013.01); *H04L 47/28* (2013.01); *H04L 47/26* (2013.01); *H04L 47/30* (2013.01); *H04L 49/505* (2013.01); *H04L 47/266* (2013.01)
USPC ......................................... 370/236

(58) Field of Classification Search
USPC ............... 370/230, 235, 236; 709/234, 235
See application file for complete search history.

(56) References Cited

U.S. PATENT DOCUMENTS

| | | | |
|---|---|---|---|
| 6,618,378 B1 | 9/2003 | Giroux et al. | |
| 6,628,613 B1 * | 9/2003 | Joung et al. | 370/230 |
| 6,721,797 B1 | 4/2004 | Kim | |
| 7,649,843 B2 * | 1/2010 | Shanley et al. | 370/235 |
| 8,312,188 B1 * | 11/2012 | White et al. | 710/56 |
| 2002/0093910 A1 | 7/2002 | Yazaki et al. | |
| 2003/0016628 A1 | 1/2003 | Kadambi et al. | |
| 2004/0081090 A1 | 4/2004 | Hara et al. | |
| 2006/0092837 A1 | 5/2006 | Kwan et al. | |
| 2006/0092845 A1 * | 5/2006 | Kwan et al. | 370/235 |
| 2009/0122702 A1 | 5/2009 | Chew et al. | |
| 2009/0219818 A1 * | 9/2009 | Tsuchiya | 370/236 |
| 2009/0300209 A1 * | 12/2009 | Elzur | 709/234 |
| 2009/0303876 A1 * | 12/2009 | Wu | 370/230.1 |
| 2010/0128738 A1 * | 5/2010 | Barrass | 370/445 |
| 2011/0261686 A1 * | 10/2011 | Kotha et al. | 370/230 |
| 2011/0261698 A1 * | 10/2011 | Kamerkar et al. | 370/235 |

OTHER PUBLICATIONS

International Search Report (PCT/US2011/036666), dated Jan. 6, 2012.

* cited by examiner

*Primary Examiner* — Hoon J Chung
*Assistant Examiner* — Yaotang Wang
(74) *Attorney, Agent, or Firm* — Womble, Carlyle, Sandridge & Rice

(57) ABSTRACT

An integrated circuit that includes a link controller and a plurality of queue controllers in communication with the link controller is provided. Each of the plurality of queue controllers is operable to be coupled to a dedicated buffer of a remote transmitter of data external to the integrated circuit. The plurality of queue controllers are operable to monitor a buffer full level for the dedicated buffer and each of the plurality of queue controllers are operable to transmit a signal indicating the buffer full level to the link controller. The link controller is operable to transmit a priority flow control signal to the remote transmitter, wherein a time period from transmission of the signal indicating the buffer full level to detection of the buffer full level is consistent for each dedicated buffer.

17 Claims, 7 Drawing Sheets

METHOD AND APPARATUS FOR IMPLEMENTING NON-BLOCKING PRIORITY BASED FLOW CONTROL

CLAIM OF PRIORITY

This application claims priority from U.S. Provisional Patent Application No. 61/345,124, filed May 16, 2010, and entitled "Method and Apparatus for Implementing Non-blocking Priority Based Flow Control." This provisional application is herein incorporated by reference.

BACKGROUND

With the movement in Storage Area Networks (SANs) to Fiber Channel over Ethernet (FCoE) and the acceptance of 10 Gigabit (Gb) Ethernet standard, a lossless methodology must be utilized to support the FCoE. Priority-based flow control is intended to eliminate frame loss due to congestion resulting from head of line blocking. Current methodologies. i.e., the 802.3x mechanism and extensions of this mechanism, for priority flow control (PFC) attempt to ensure zero loss under congestion in Data Center Bridging Networks and specify traffic classes that may be paused. These methodologies tend to stop other types of data traffic when storage needs more bandwidth. In addition, a buffer overflow situation may occur due to the partially blocking nature of the current architecture where a traffic scheduler managing traffic from multiple priority queues as the traffic scheduler blocks the head of the line carrying all priorities.

It is in this context that embodiments arise.

SUMMARY

Embodiments described herein provide circuits and methods implementing priority based flow control for a communication standard such as 10 Gb Ethernet. It should be appreciated that the present embodiments can be implemented in numerous ways, such as a process, an apparatus, a system, a device or a method on a computer readable medium. Several inventive embodiments are described below.

In one embodiment, an integrated circuit having the priority based flow control logic described herein is provided. The integrated circuit includes a link controller and a plurality of queue controllers in communication with the link controller. Each of the plurality of queue controllers are operable to be coupled to a dedicated buffer of a remote transmitter of data external to the integrated circuit. The plurality of queue controllers are operable to monitor a buffer full level for the dedicated buffer and each of the plurality of queue controllers are operable to transmit a signal indicating the buffer full level to the link controller. The link controller is operable to transmit a priority flow control signal to the remote transmitter, wherein a time period from transmission of the signal indicating the buffer full level to detection of the buffer full level is consistent for each dedicated buffer. In one embodiment, each of the plurality of queue controllers is operable to independently control a response to the signal indicating the buffer full level.

In another embodiment, a method for providing priority based flow control in a non-blocking manner is provided. The method includes monitoring a buffer level for a plurality of external buffers processing data. The monitoring is performed through dedicated queue controllers for each of the plurality of buffers, wherein the dedicated queue controllers are located off chip from the plurality of external buffers. The method also includes detecting a buffer full condition at a first buffer through a first queue controller and transmitting a first signal operable to cause the first buffer to discontinue the processing. The monitoring of the first buffer is paused for a time period specified by the first signal. Upon expiration of the time period, the monitoring of the buffer level for the first buffer is continued, wherein during the pausing of the monitoring of the first buffer a buffer full condition at a second buffer is detected through a second queue controller.

Other aspects will become apparent from the following detailed description, taken in conjunction with the accompanying drawings, illustrating by way of example the principles of the embodiments.

BRIEF DESCRIPTION OF THE DRAWINGS

The embodiments may best be understood by reference to the following description taken in conjunction with the accompanying drawings.

DETAILED DESCRIPTION

The following embodiments describe circuits and methods for a priority based flow control mechanism. It should be appreciated that the present exemplary embodiments may be practiced without some or all of these specific details. In other instances, well-known operations have not been described in detail in order not to unnecessarily obscure the present embodiments.

Current implementations for priority based flow control require a tradeoff between bandwidth and time for response, i.e., the time period to verify or re-check whether Xoff/Xon signals are to be transmitted. The current embodiments address this issue by decoupling the functions. The decoupling is achieved by a dedicated queue controller for each queue, and a link controller in communication with the dedicated queue controllers. This decoupled architecture handles a priority based flow control in Ethernet full duplex link and is scalable to support multiple priority queues, where a dedicated queue controller is provided for each queue. The partitioning of the link control function and the queue control function is achieved in a pseudo independent fashion. The link controller and queue controllers publish their current status to each other and provide the earliest possible opportunity to transmit either an Xoff or Xon frame for any queue.

Each queue controller has access to the status of link controller to indicate when to transmit Xon/Xoff frames. The link controller accesses the status of every queue controller to send Xoff/Xon frames for corresponding priorities. In one embodiment, as many queue controllers as needed by the system may be provided. For example, if a user wants to have a priority flow control (PFC) controller support four queues, there will be four instances of the queue Finite State Machine (FSM) and one common Link FSM. Through the embodiments described in further detail below a priority based flow control technique is provided for an Ethernet transmission, such as a transmission over a 10 Gb Ethernet system.

Figure 1:
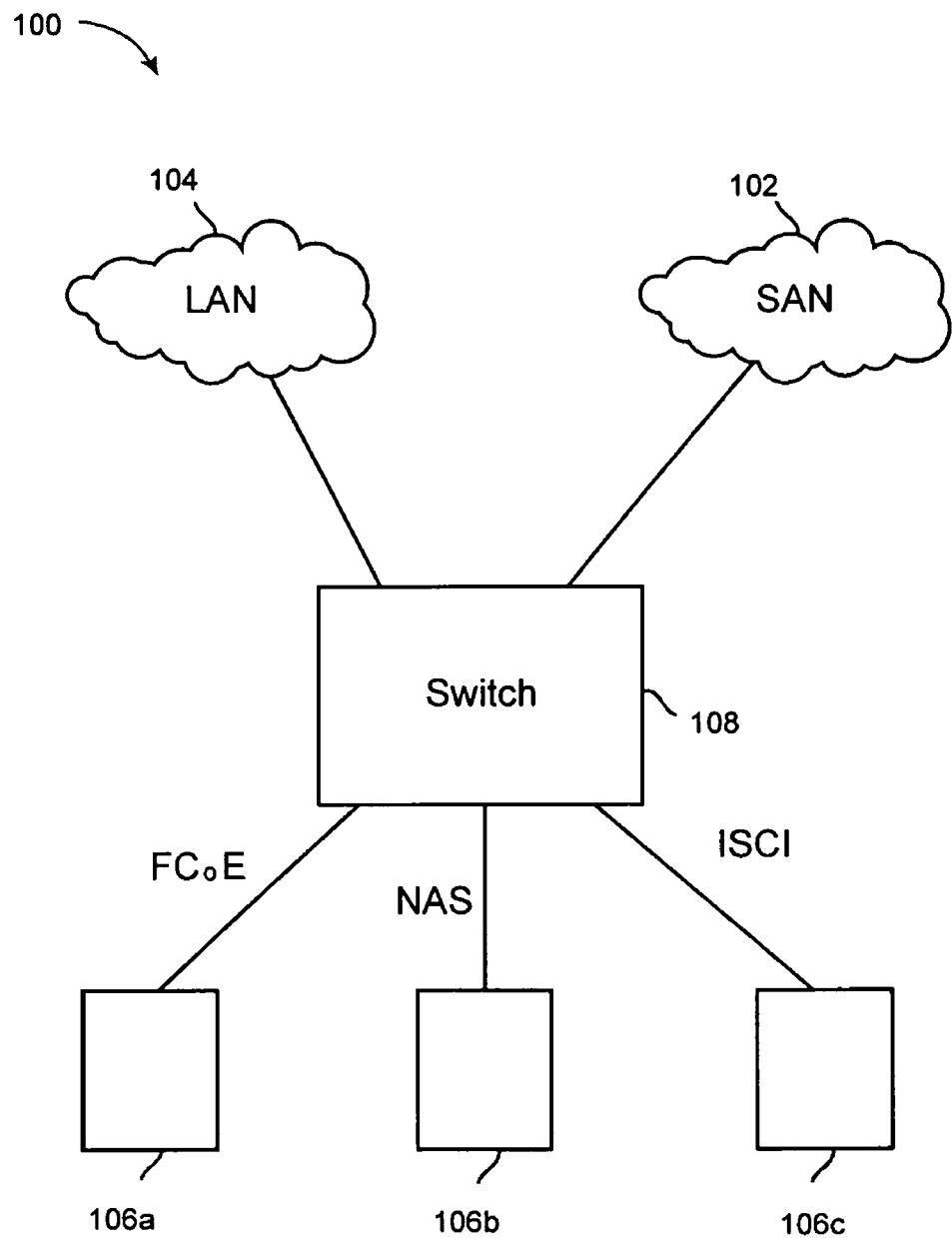
FIG. 1 is a simplified schematic diagram illustrating a high level overview of a system employing priority based flow control in accordance with one embodiment.

FIG. 1 is a simplified schematic diagram illustrating a high level overview of a system employing priority based flow control in accordance with one embodiment. System 100 includes storage area network (SAN) 102, local area network (LAN) 104 and servers 106a through 106c, each of which are connected through appliance 108. In one embodiment, appliance 108 is a switch which enables unified access to a unified fabric which may include LAN traffic, Internet Protocol (IP) based storage traffic, and fiber Channel-based storage traffic. In another embodiment the unified fabric is provided through a 10 Gigabit (Gb) Ethernet system. It should be appreciated that the logic defined through the embodiments below may reside within appliance 108 or servers 106a through 106c in one exemplary implementation.

Figure 2:
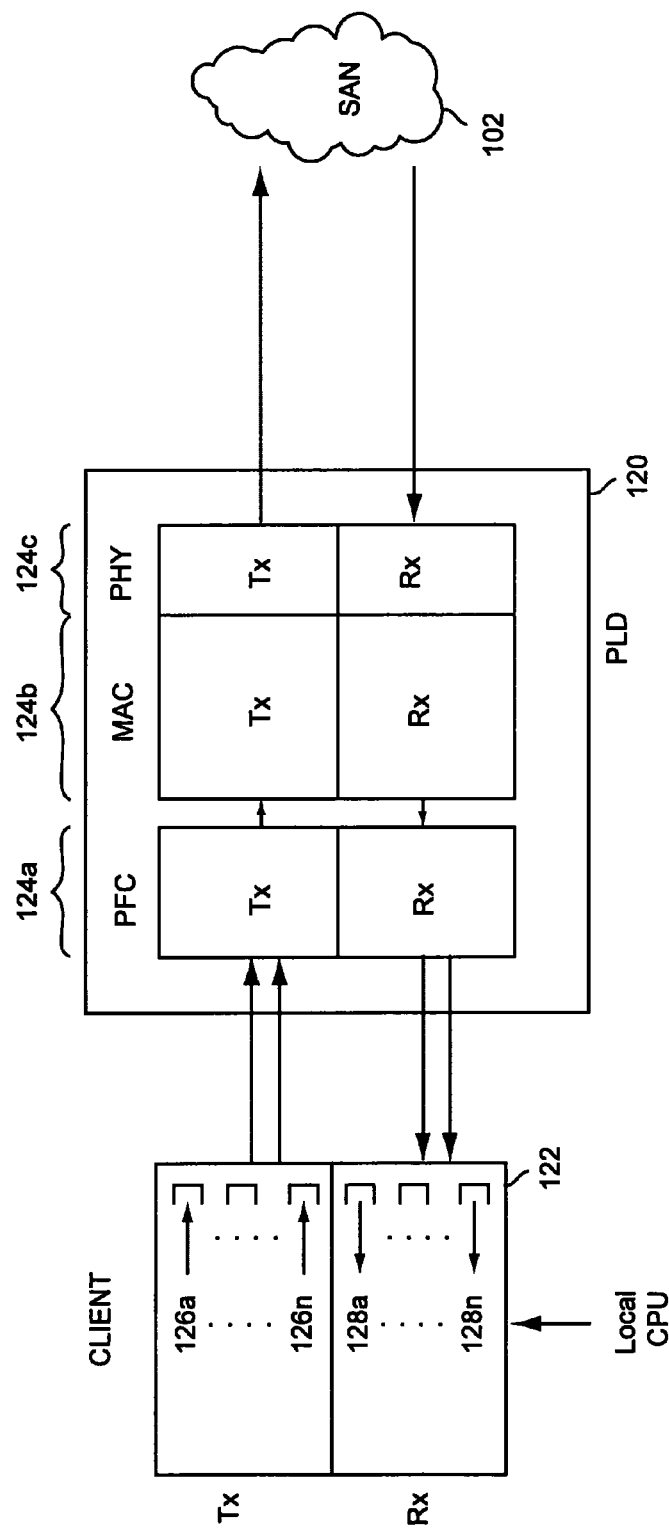
FIG. 2 is a simplified schematic diagram illustrating further details on the circuitry for a priority based flow control in accordance with one embodiment.

FIG. 2 is a simplified schematic diagram illustrating further details on the circuitry for a priority based flow control in accordance with one embodiment. In FIG. 2, client 122 is in communication with integrated circuit 120, which in turn is in communication with storage area network 102. It should be appreciated that integrated circuit 120 and client 122 may reside in the server or appliance illustrated in FIG. 1, in one embodiment. In another embodiment, client 122 may be a local central processing unit. In yet another embodiment, integrated circuit 120 may be a programmable logic device, such as a field programmable gate array or application specific integrated circuit. Within integrated circuit 120 are priority flow control (PFC) logic 124a, media access control (MAC) logic 124b, and physical (PHY) layer 124c. As illustrated, within each of these modules is a corresponding transmit (Tx) and receive (Rx) component. Client 122 also includes a corresponding transmit and receive components, wherein each transmit and receive component includes a plurality of queues. Within the transmit component of client 122 are queues 126a through 126n, and within the receive component of the client are queues 128a through 128n. Priority flow control logic 124a of integrated circuit 120 provides dedicated queue controllers for each of the queues within client 122. In addition, priority flow control logic 124a includes a link controller in communication with a plurality of the dedicated queue controllers as described in further detail below with regard to FIG. 4.

Figure 3:
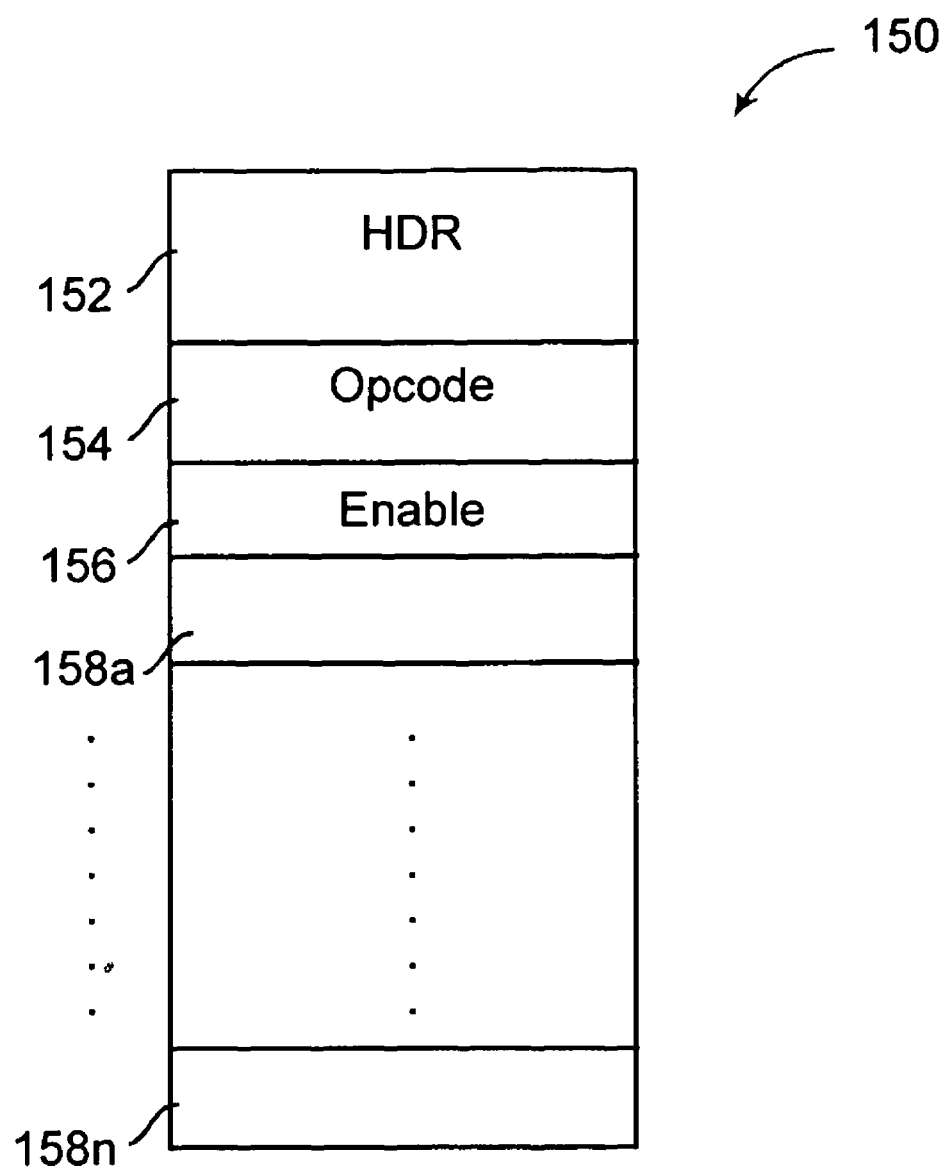
FIG. 3 is a simplified schematic diagram illustrating an exemplary packet format utilized by the priority based flow control in accordance with one embodiment.

FIG. 3 is a simplified schematic diagram illustrating an exemplary packet format utilized by the priority based flow control in accordance with one embodiment. Packet 150 is configured to include a plurality of fields, such as header 152 and opcode 154. Enable vector 156 is a bit setting indicating whether the parameters set below are valid or invalid, e.g., ignore the pause time or consider the pause time. Parameters 158a-n provide a pause time for each corresponding queue, which is communicated to a corresponding queue controller. In one embodiment, individual queue times for up to eight queues may be covered through packet 150. In another exemplary embodiment, a bit value of 1 in enable vector 156 indicates that a pause time for the corresponding parameter associated with the corresponding queue should be instituted.

It should be appreciated that the amount of pause time may be indicated through a bit value. The bit value representing the pause time may be referred to as a quanta. A value of zero in enable vector 156 will essentially disable whatever value is indicated in the corresponding parameter 158. In another embodiment, determination of whether an Xoff or Xon frame is transmitted to the external buffer is based on the corresponding bit values in parameters 158a-n. For example, if the bit value within parameter 158a is a zero, then an Xon frame is sent to the corresponding external buffer. If the bit value is any value besides zero, then an Xoff frame is transmitted to the corresponding external buffer located at the remote end of the network link. In addition, if the bit value is any value besides zero, the bit value represents the amount of pause time, or quanta where one quanta is equal to 512 bit times, prior to rechecking the buffer level. Further details on the packet configuration may be found in IEEE standard 802.1Qbb.

Figure 4:
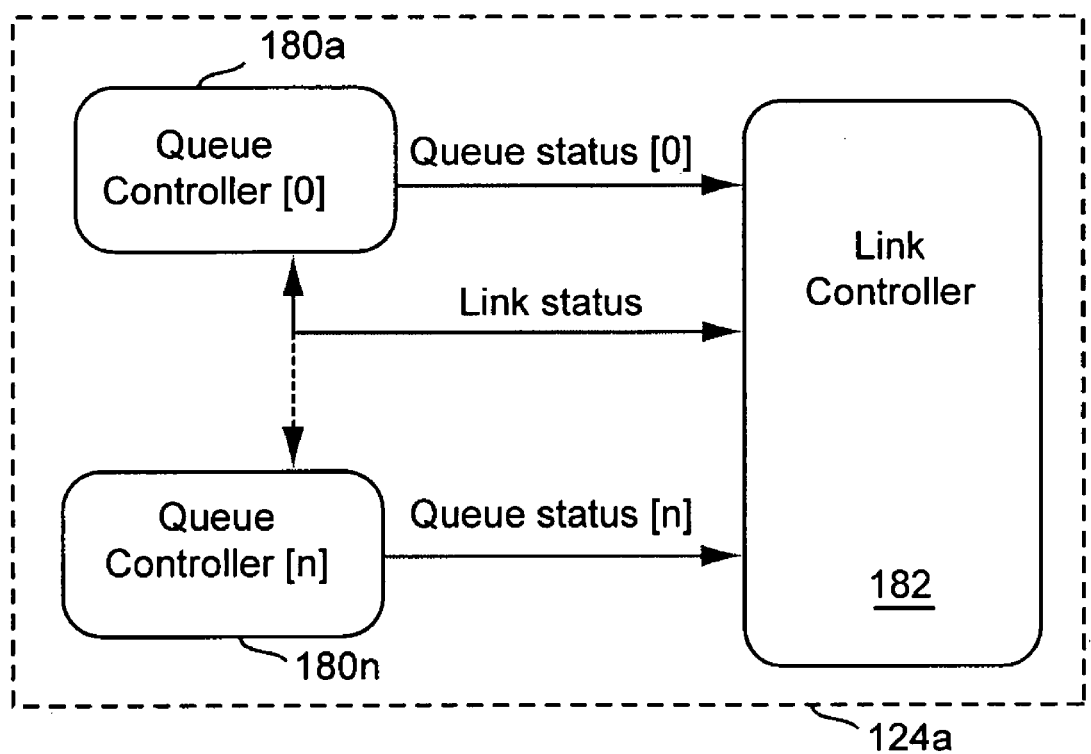
FIG. 4 is a simplified schematic diagram illustrating the partitioned link control and queue control in accordance with one embodiment.

FIG. 4 is a simplified schematic diagram illustrating the partitioned link control and queue control in accordance with one embodiment. Priority flow control logic 124a includes queue controller logic 180a through 180n. In communication with each instance of queue controller logic 180 is link controller logic 182. It should be appreciated that in one embodiment there is a one to one correspondence between the number of queues, or ingress buffers, in the client and the number of queue controllers 180 in the priority flow control logic, i.e., one queue controller is dedicated to one buffer. For example, if there are eight queues, then there would be eight queue controllers where each queue is associated with a dedicated queue controller. Queue controllers 180a-180n receive a pulse that indicates a corresponding queue or ingress buffer is full. In one embodiment, queue controllers 180a-n monitor a signal line for a transition. For example, when the signal transitions from a logical low value to a logical high value, this may indicate that the buffer/queue has reached a full limit. It should be noted that the full limit may be a percentage of the full level for the queue in one embodiment. In turn, the corresponding queue controller 180a-n issues a signal, such as a queue status signal to link controller 182 that triggers the link controller to instruct the remote sender to discontinue sending packets to the queue. In one exemplary embodiment, an Xoff signal provides the instruction to discontinue sending packets to the queue.

Still referring to FIG. 4, link controller 182 transmits the Xoff signal to the corresponding remote sender and then communicates back to queue controllers 180a-n that link controller 182 is ready for any further action through the link status signal. If the signal monitored by the queue controller transitions from a high value to a low value, the corresponding queue is now available for additional data. Accordingly, the queue status signal will transition to indicate to link controller 182 that an Xon signal may be transmitted to the remote sender in order to continue sending packets. As noted above, the time period (quanta) for waiting before link controller 182 checks the status of the queue status signal is communicated to the link controller through corresponding queue controller 180. Thus, the time period (quanta) for each queue/buffer can be customized through the embodiments described herein so that a non blocking lossless Ethernet connection that does not block any other queue Xoff request is achieved. Thus while link controller 182 is waiting for the time period (quanta) to check the status of a first queue, the link controller is able to check the status of the remaining queues and transmit applicable Xon and Xoff signals for each of the remaining queues as required. In addition, the embodiments eliminate the possibility of buffer overruns as discussed in more detail with reference to FIG. 6.

Figure 5:
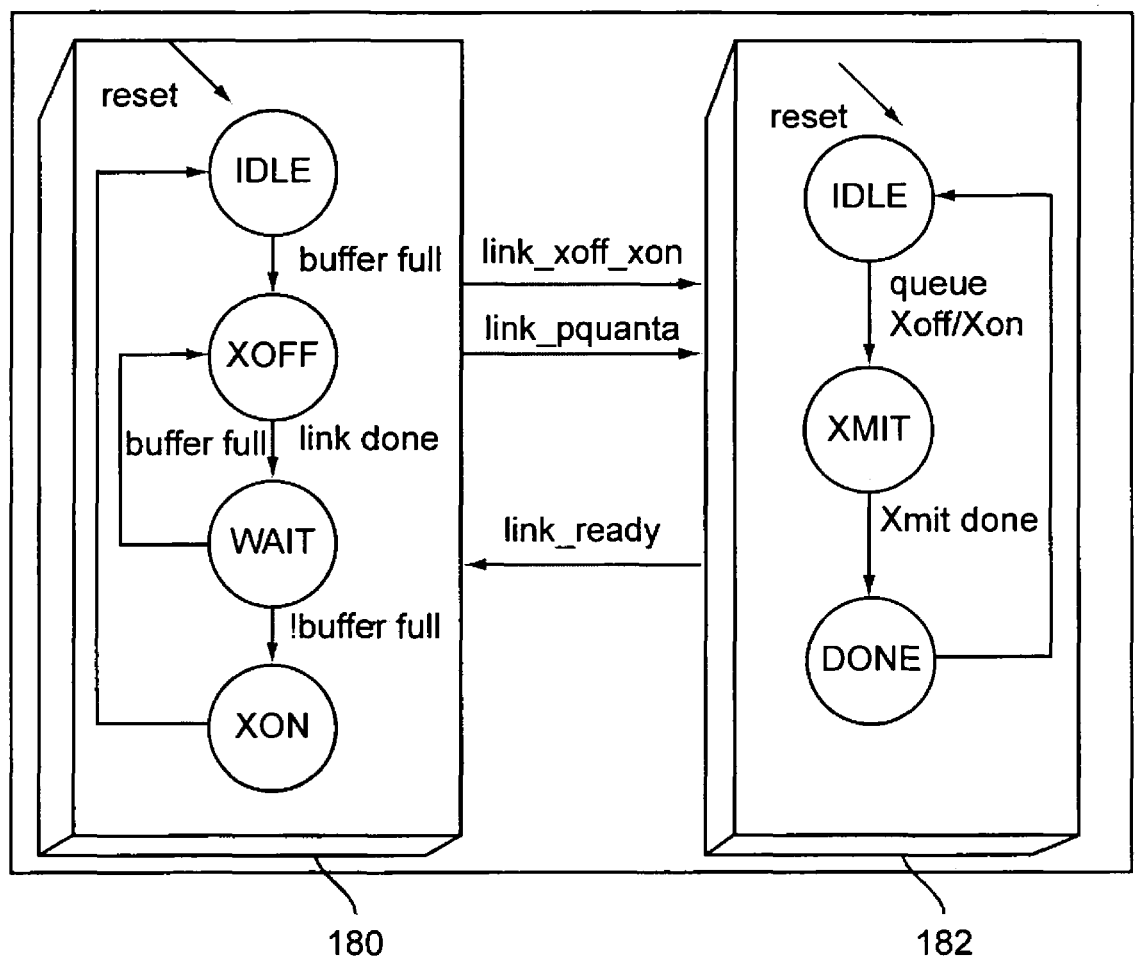
FIG. 5 is a simplified schematic diagram illustrating state diagram for the exchange of status information between the link controller and the queue controllers in accordance with one embodiment.

FIG. 5 is a simplified schematic diagram illustrating a state diagram for the exchange of status information between the link controller and the queue controllers in accordance with one embodiment. The state diagram for queue controller 180 indicates that the queue controller initially sits idle until a buffer full signal is received. As mentioned above, the buffer full signal may be triggered when the buffer level obtains a percentage of a completely full level. In response to the buffer full signal, an Xoff state occurs and indicates to the link controller that the ingress buffer is full. Upon completion of the transmission of the Xoff signal, link controller 182 communicates the completion of the transmission to queue controller 180 and a wait period occurs for the link controller prior to rechecking the status of the queue controller signal for the queue experiencing the buffer full condition. Once the buffer not full condition is detected an Xon state occurs and link controller 182 transmits an Xon frame. If the buffer congestion still continues, then the state transitions back to the XOFF state. With regard to the state diagram for link controller 182, the link controller is idle until an Xoff or Xon condition is detected through the link_xoff_xon_valid and link_pquanta values. The link_xoff_xon_valid signal indicates that the ingress buffers require either an Xoff or Xon frame to be sent by the link controller in one embodiment. The type of frame may be indicated through a non zero pause quanta value as discussed above. The link_pquanta signal indicates the pause quanta requested by the client in one embodiment. Link controller 182 transmits the corresponding priority flow control frame (Xon or Xoff) to the corresponding remote issuer and returns to an idle state. The link_ready signal indicates that the link controller has sent the corresponding priority flow control frame (Xon or Xoff) and is going to scan the current status information from the queue controller or queue controllers.

Figure 6:
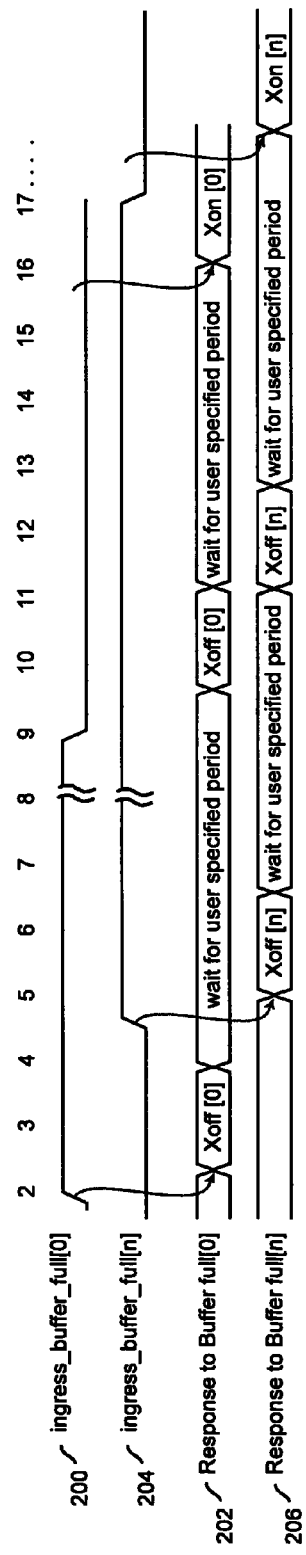
FIG. 6 is a waveform diagram illustrating the non-blocking flow control between queues in accordance with one embodiment.

FIG. 6 is a waveform diagram illustrating the non-blocking flow control between queues in accordance with one embodiment. As illustrated by waveform pairs 200/202 and 204/206, the dedicated queue controllers are able to service their dedicated queues with consistent timing and enable the Xoff frames to be transmitted by the link controller without any blocking. In addition, through the embodiments described herein the specified wait period may be customized for each buffer. The ingress_buffer_full signal of waveform 200 transition to a high level and triggers the Xoff[0] transmission depicted in waveform 202. During the wait/pause period after Xoff[0], ingress_buffer_full signal of waveform 204 transitions to a high level. In response, transmission of Xoff[n] is triggered as depicted in waveform 206. Continuing with waveform 202, upon expiration of the first wait period, the level of ingress_buffer_full signal of waveform 200 is sampled and as the level remains at a logical high level, an Xoff transmission results followed by a second wait period. Upon expiration of the second wait period on waveform 202, waveform 200 has transitioned to a logical low value and Xon[0] is transmitted to indicate that buffer 0 can continue to receive data. In a similar manner, upon expiration of the first wait period in waveform 206, the level of ingress_buffer_full signal of waveform 204 is sampled and as the level remains at a logical high level, an Xoff transmission results followed by a second wait period as illustrated on waveform 206. Upon expiration of the second wait period on waveform 206, waveform 204 has transitioned to a logical low value and Xon[n] is transmitted to indicate that buffer n can continue to receive data. It should be appreciated that the embodiments described herein eliminate the possibility of a buffer overrun as a time period from transmission of the signal indicating the buffer full level to detection of the buffer full level is consistent for each dedicated buffer since the queue controllers independently control a response to the signal indicating the buffer full level. It should be further appreciated that under a single controller architecture it is possible to block new Xoff requests for a period of time defined by the wait period and during that wait period, one of the buffers may overflow resulting in a loss of data. The decoupling of the link and queue controller functionality ensures a non-blocking, e.g., lossless environment, which cannot be ensured through a single unified controller architecture. While the exemplary embodiments discuss the link controller as maintaining the pause, it should be appreciated that each queue controller may incorporate the functionality to manage or maintain their respective pauses in an alternative embodiment.

Figure 7:
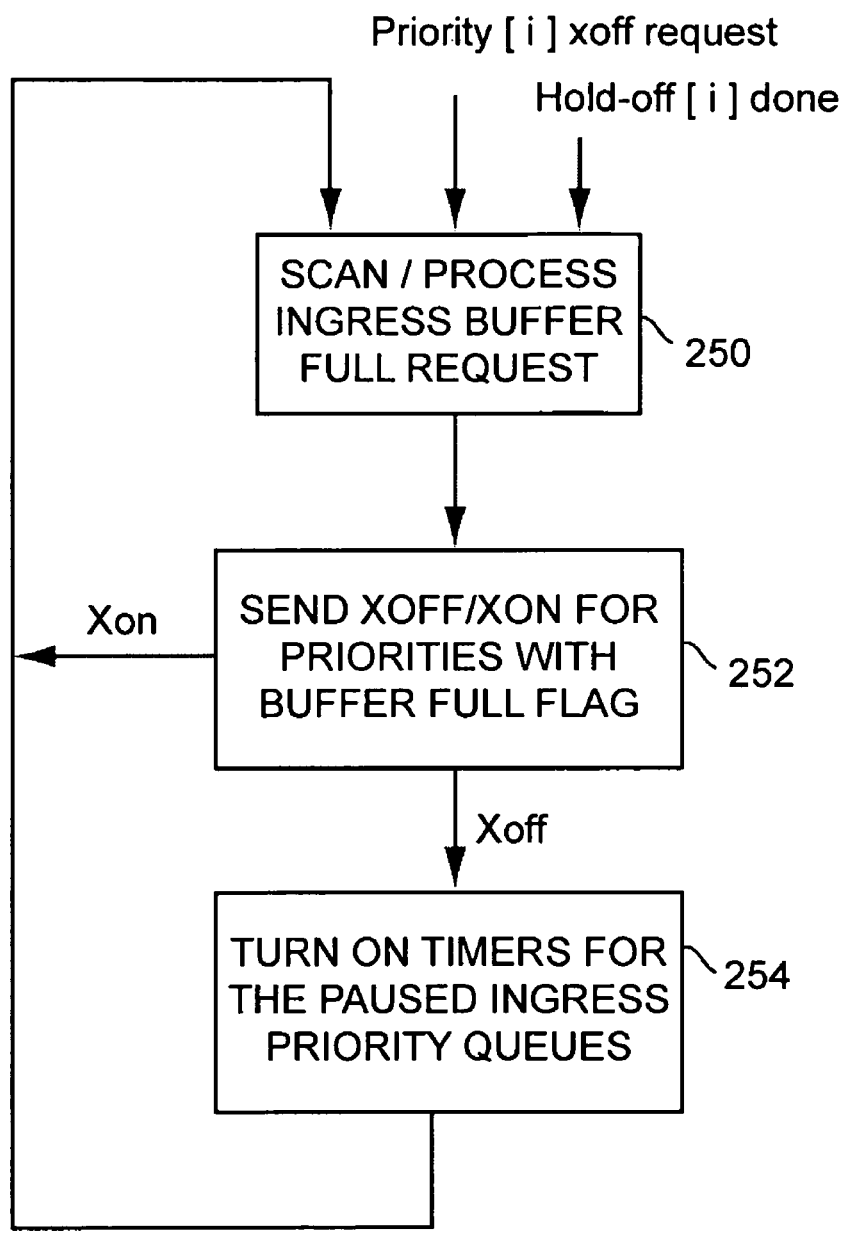
FIG. 7 is a simplified flowchart diagram for a finite state machine implementing the method for priority based flow control in accordance with one embodiment.

FIG. 7 is a simplified flowchart diagram for a finite state machine implementing the method for priority based flow control in accordance with one embodiment. The ingress buffers are scanned for a full condition in operation 250. It should be appreciated that the corresponding queue controller for each ingress buffer may perform the scanning for a full condition in the corresponding buffer. In operation 252, Xoff/Xon signals are transmitted for buffers, with the buffer full flag/not full flag, respectively. As illustrated with reference to FIG. 6, transition from between logical values on an ingress_buffer_full signal line may represent a transition from a buffer full condition (buffer full flag) to a buffer not full condition (buffer not full flag). In operation 254, the timers are turned on for the corresponding paused buffers when the buffer full flag is asserted, thereby pausing data being sent to the buffer. If the buffer not full flag is asserted in operation 252, then operation 254 is bypassed and the method returns to operation 250 and repeats as described above.

Embodiments described above may be practiced with various computer system configurations including hand-held devices, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

The embodiments, thus far, were described with respect to integrated circuits. The method and apparatus described herein may be incorporated into any suitable circuit. For example, the method and apparatus may be incorporated into numerous types of devices such as microprocessors or programmable logic devices. Exemplary programmable logic devices include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended exemplary claims.

The invention claimed is:

1. An integrated circuit (IC), comprising:
   a link controller; and
   a plurality of queue controllers in communication with the link controller, each queue controller of the plurality of queue controllers operable to be coupled to a corresponding external dedicated buffer, wherein each external dedicated buffer resides in a remote transmitter of data that is external to the IC, and wherein each queue controller of the plurality of queue controllers is operable to:
   monitor and detect a buffer full level for the corresponding external dedicated buffer,
   transmit a signal indicating one of the buffer full condition or buffer below full condition associated with the corresponding external dedicated buffer to the link controller, and
   wherein the link controller is operable to:
   receive, from a first queue controller, the signal indicating the buffer full condition associated with a first external dedicated buffer,
   transmit a priority flow control signal to discontinue sending data to the first external dedicated buffer based on the received signal from the first queue controller,
   communicate to the first queue controller a second signal interpreted by the first queue controller as indicating completion of the transmission of the priority flow control signal,
   receive, from the first queue controller, a pause time associated with the first external dedicated buffer, the pause time indicating a time period that the link controller waits before rechecking a buffer level.

2. The IC of claim 1, wherein the pause time is independently programmable for each external dedicated buffer.

3. The IC of claim 1, wherein the IC is a programmable logic device.

4. The IC of claim 1, wherein the IC is incorporated into a switch operable to process storage data over a network.

5. A programmable logic device (PLD), comprising:
   link controller logic; and
   a plurality of queue controllers in communication with the link controller logic, each queue controller of the plurality of queue controllers operable to be coupled to a corresponding dedicated buffer, wherein each dedicated buffer resides in a remote transmitter of data that is external to the PLD, and wherein each queue controller of the plurality of queue controllers is operable to:
   monitor a buffer full level for the corresponding dedicated buffer,
   transmit a signal indicating one of the buffer full condition or buffer below full condition associated with the corresponding dedicated buffer to the link controller logic, and
   wherein the link controller logic is operable to:
   transmit a priority flow control signal to discontinue sending data to at least one of the dedicated buffers based on the signal indicating the buffer full condition associated with the dedicated buffer,
   communicate to a queue controller associated with the dedicated buffer a second signal interpreted by the queue controller as indicating completion of the transmission of the priority flow control signal,
   receive, from the queue controller, a pause time associated with the dedicated buffer, the pause time indicating a time period that the link controller waits before rechecking a buffer level.

6. The PLD of claim 5, wherein the priority flow control signal is triggered by the signal indicating the buffer full condition.

7. The PLD of claim 5, wherein the time period from transmission of the priority flow control to detection of the buffer full condition by the link controller logic is consistent for a given dedicated buffer.

8. The PLD of claim 5, wherein the pause time is independently programmable for each dedicated buffer.

9. The PLD of claim 5, wherein the PLD is incorporated into a switch operable to process storage data over a network and wherein each dedicated buffer is included in an integrated circuit external to the PLD.

10. The PLD of claim 5, wherein the priority flow control signal is a data packet operable to cause the dedicated buffer to one of stop transmitting data or start transmitting data according to a bit setting in the data packet.

11. The PLD of claim 10, wherein the bit setting represents a pause time and a bit setting of zero causes the dedicated buffer to start transmitting data.

12. A method for non blocking priority flow control, comprising:
    monitoring a plurality of buffer level signals indicating a buffer status for a plurality of buffers processing data, the monitoring performed through a plurality of queue controllers, wherein each queue controller of the plurality of queue controllers is operable to be coupled to a corresponding buffer of the plurality of buffers, wherein the plurality of buffers reside in a remote transmitter of data that is external to an integrated circuit (IC) in which the plurality of queue controllers reside;
    detecting a buffer full condition at a first buffer of the plurality of buffers processing data through a first queue controller;
    communicating the buffer full condition via an output signal to a link controller from the first queue controller;
    transmitting, by the link controller, a priority flow control signal to discontinue sending data to the first buffer based on the output signal;
    communicating to the first queue controller associated with the first buffer another signal interpreted by the first queue controller as indicating completion of the transmission of the priority flow control signal;
    transmitting, by the first queue controller, a first signal operable to cause the first buffer of the plurality of buffers processing data to discontinue the processing; pausing monitoring of the output signal of the first queue controller for a time period specified by the first signal, the time period indicative an amount of time that the link controller waits before rechecking a buffer level; and
    upon expiring of the time period, continuing the monitoring of the output signal of the first queue controller, wherein contemporaneously during the pausing of the monitoring of the output signal of the first queue controller, monitoring an output signal of a second queue controller.

13. The method of claim 12, further comprising:
    transmitting a second signal operable to cause the second buffer of the plurality of buffers processing data to discontinue the processing in response to detecting a buffer full condition at a second buffer of the plurality of buffers processing data through the second queue controller; and
    pausing the monitoring of an output signal of the second queue controller for a time period specified by the second signal, wherein transmitting the second signal occurs prior to the time period specified by the first signal.

14. The method of claim 13, wherein the time period specified by the second signal is different than the time period specified by the first signal.

15. The method of claim 12 further comprising:
    transmitting a data packet having a bit setting that causes the first buffer to discontinue the processing, wherein the processing is one of transmitting or receiving data packets, and wherein the plurality of buffers processing data are located off chip from the plurality of queue controllers.

16. The method of claim 12 further comprising:
    detecting a buffer below full condition upon expiration of the time period; and
    transmitting a third signal operable to cause the first buffer to continue the processing.

17. The method of claim 16, wherein the third signal and the first signal are data packets and wherein the third signal differs from the first signal solely by a single bit setting of a common filed of the data packets.

* * * * *